Jan. 31, 1933.    G. E. STRANDT    1,895,595
GATE STRUCTURE
Filed May 9, 1931    2 Sheets-Sheet 2
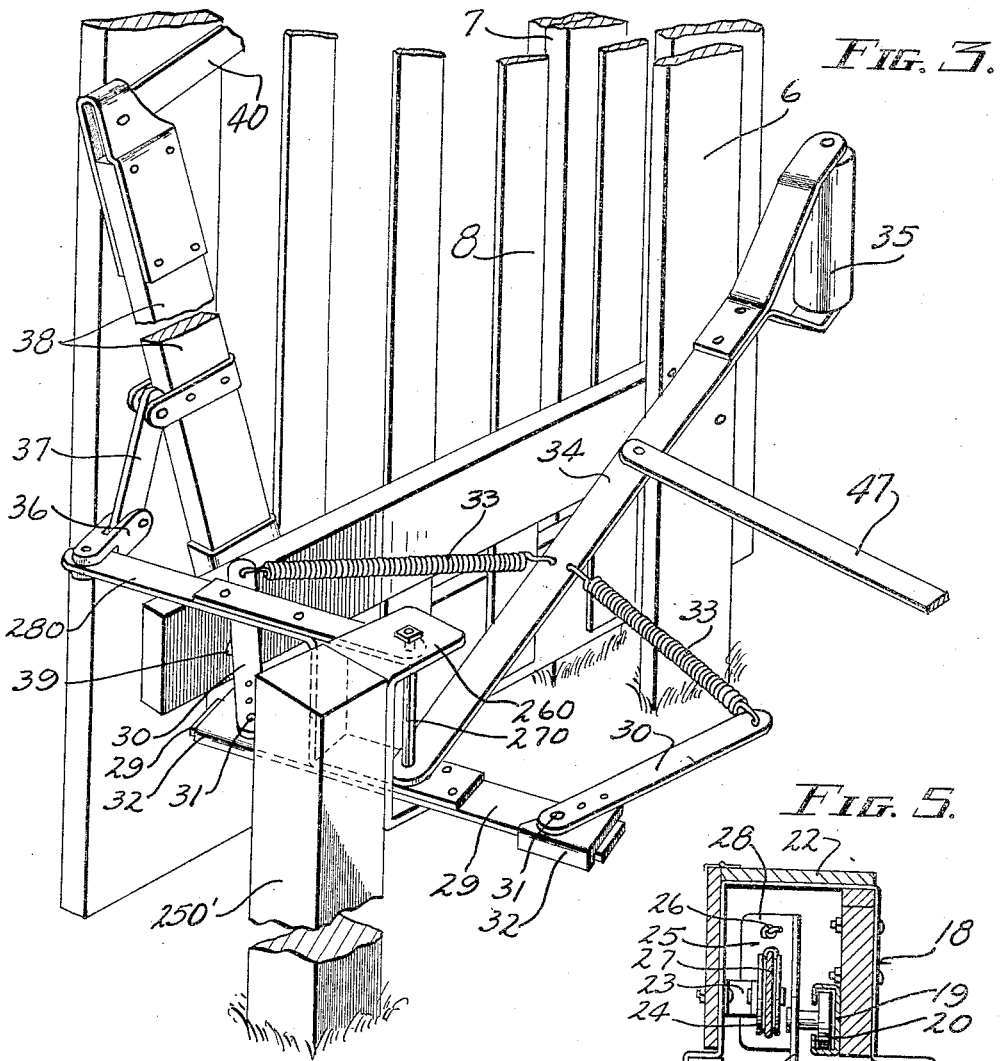
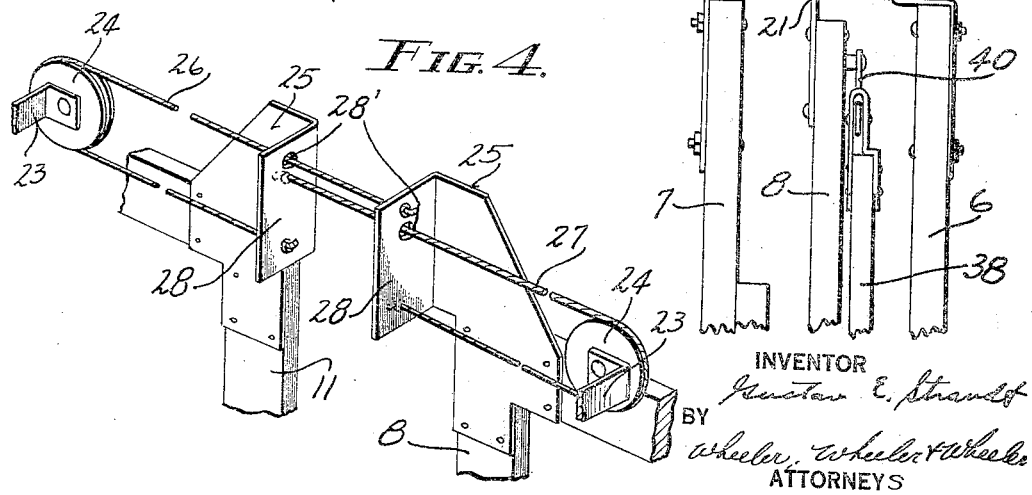
INVENTOR
Gustav E. Strandt
BY Wheeler, Wheeler & Wheeler
ATTORNEYS Patented Jan. 31, 1933

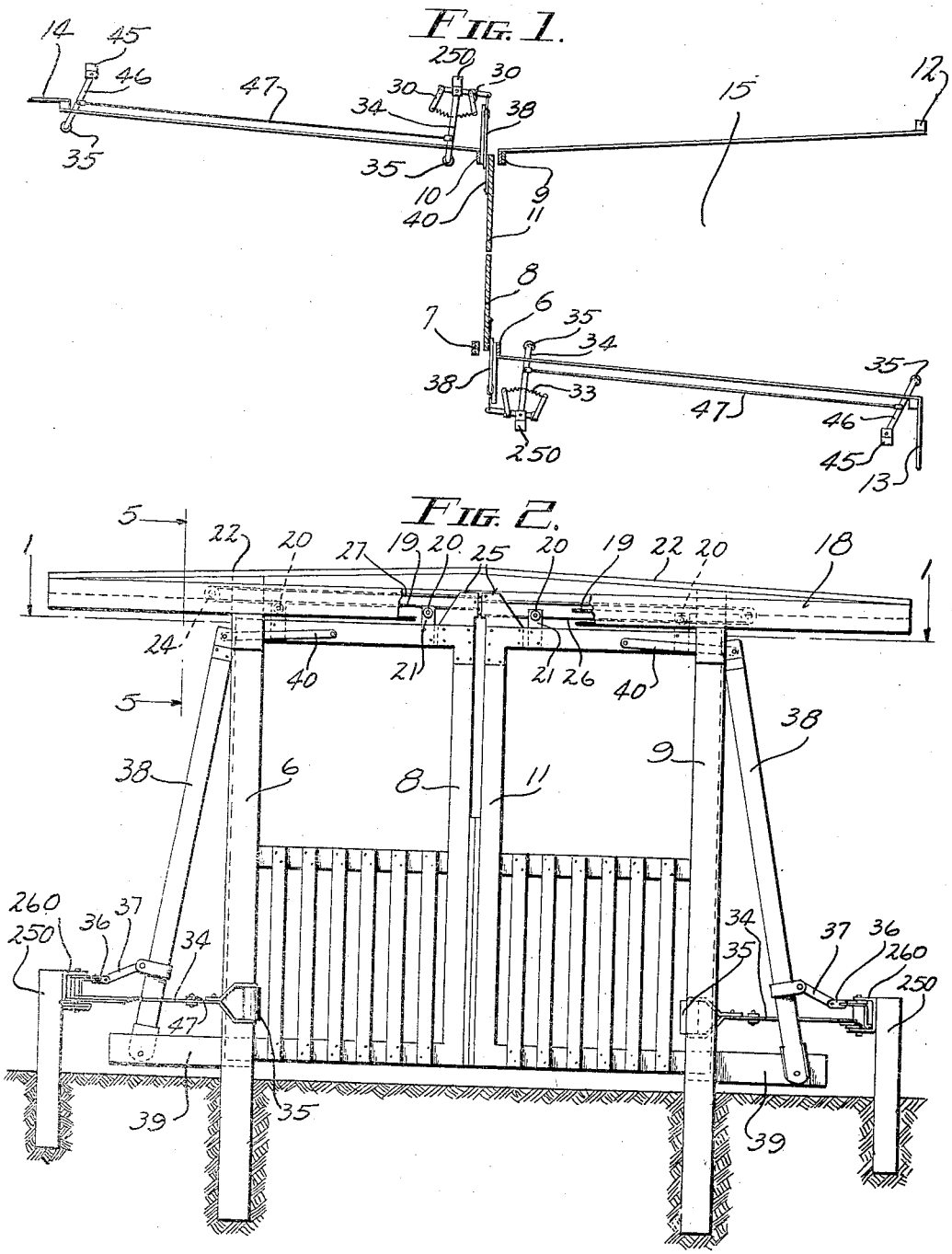

1,895,595

UNITED STATES PATENT OFFICE

GUSTAV E. STRANDT, OF MILWAUKEE, WISCONSIN

GATE STRUCTURE

Application filed May 9, 1931. Serial No. 536,096.

This invention relates to improvements in gate structures.

It is the object of the invention to provide a novel and improved gate having simple and convenient operating mechanism so organized that it may be operated by the bumper of an automobile without requiring the operator either to alight or to reach out from the vehicle.

More specific objects have to do with a novel and improved and convenient hanging of the component gate or door elements, and the interconnection thereof; means to protect the mechanism against injury; and means whereby the gate may be not only opened, but closed in the manner described.

In the drawings:

Figure 1 is a diagrammatic plan view of a gate structure embodying this invention as it appears when set up in a fence corner, the gates and gate posts being shown in the section indicated by line 1—1 in Fig. 2.

Figure 2 is a front elevation of a gate structure embodying this invention as it appears independent of the fencing.

Figure 3 is an enlarged fragmentary detail in perspective, of the lower corner of one of the gates or doors as it stands open, and the operating connections therefor.

Figure 4 is an enlarged fragmentary detail in perspective of the upper inner corners of the two gates or doors and the cross connections by which they are interconnected for simultaneous opposite operation.

Figure 5 is an enlarged fragmentary detail in section in the plane indicated at 5—5 in Fig. 2.

Like parts are identified by the same reference characters throughout the several views.

The gate posts are disposed in pairs, posts 6 and 7 being spaced to provide for the retractive movement of the gate or door 8, and posts 9 and 10 being spaced to provide for the retractive movement of the gate or door 11. It will be noted that the two pairs of posts are disposed at some distance from the corner post 12, at which the line fences 13 and 14 would normally join. Connection from the corner post 12 is made to gate post 9, and from the line fence 13 is made to gate post 6, thereby providing a corridor at 15 into which a motor vehicle may be driven pending manipulation of the gate.

Spanning the upper ends of gate posts 6, 7, 9 and 10, is a box 18 which projects sufficiently beyond the gate posts as shown in Fig. 2, to provide enclosed support for the C-shaped track 19 which is housed within the box and receives the gate supporting wheels or rollers 20 which are mounted on hangers 21 near the opposite sides of the respective gates, as shown in Fig. 2. The lid 22 of box 18 is hinged as shown in Fig. 5, to afford easy access to the interior of the box. It preferably has sufficient inclination to shed water as shown in Fig. 2.

At the back of the box are brackets 23 carrying pulleys 24. Angle plates 25 mounted on the tops of the respective doors or gates at their inner margins provide anchorages for ropes 26 and 27 passing about pulleys 24 and connected at their opposite ends with different gates. Each rope has its bottom flight connected near the bottom of the projecting flange 28 of one of the angle plates, passes thence about one of the pulleys 24, and back through a guide opening 28' in the same flange 28 to an anchorage in the flange 28 connected with the other gate. As a result of this arrangement there is very little possibility that the ropes will leave their respective pulleys, and the gates are interconnected for opening and closing movement in unison but in opposite directions.

The operating connections are as follows: Operating posts 250 are located near the respective pairs of gate posts at opposite sides of the gate. The operating connections are in duplicate. Each post 250 supports by means of a C-bracket 260 and a pintle 270, the upper and lower bars 280 and 29 of a unitarily connected lever structure.

Arms 30 are pivoted at 31 to bar 29 and provided with plates 32 engaging the ends of the bar to limit their pivotal movement toward each other. These arms are connected by tension spring 33 and the operating lever 34 which projects into the path of movement of the vehicle approaching the gate, and is provided with a roller at 35 for engagement by the vehicle bumper. It is contemplated that the vehicle will be turned slightly from its normal path of movement through the gate to engage the roller 35, and after the gate has been moved to open position the vehicle will be backed slightly away from the gate in order to pass in a straight line therethrough. A skilled operator will be able to strike the roller 35 just sufficiently to open the gate without requiring this reverse movement.

When one of springs 33 is under tension sufficient to permit movement of operating lever 34 with respect to bar 29, the other spring need not bend because of the free pivotal movement of arm 30 connected thereto in the direction in which such spring must yield.

Movement of operating lever 34 produced by engagement of a vehicle with its roller 35, is transmitted through one of the springs 33 and the corresponding arm 30 to bar 29, and thence to bar 280, the two bars being caused to fulcrum in unison upon pintle 270. This movement is transmitted through links 36 and 37 to an elongated lever 38 which is pivoted to an arm 39 projecting from the bottom of the gate post and is connected at its upper end by link 40 with the adjacent gate. Obviously, the movement of one of the gates by the operating connections adjacent thereto is transmitted to the other gate and also to the operating connections of the other gate.

Spaced from each operating post 250 at a distance at least equal to the length of the vehicle which is to manipulate the gate, is a secondary operating post 45 carrying a gate closing lever 46 connected by a link 47 with the operating lever 34. After the gate has been opened and the vehicle has passed through, the engagement of its bumper with roller 35 in the closing lever 46 will produce a reverse movement of operating lever 34, thereby bringing both of the gates or doors simultaneously to their normally closed position.

The gate may thus be operated by the vehicle itself in either direction of the movement of the vehicle. Any excessive movement of the operating lever 34 is absorbed in one of the tension springs 33 without injury to the connections. The arcuate movement of roller 35 at the end of operating lever 34 carries it away from the rectilinear path of movement of the vehicle, so that it is possible for a vehicle bumper striking the roller to operate the gate and then clear the roller due to the lateral component of roller movement in the course of opening the gate.

The structure disclosed is strong, light, inexpensive, neat, and easily operated, and many of its features may be changed without sacrificing advantages of the invention which are apparent to those skilled in the art. For example, the fencing between corner post 12 and gate post 9 may obviously be eliminated because of the fact that the gate is located at a corner, whereas if the gate were located at an intermediate point in the fencing, it would be very desirable to have this section of fence but the complementary section on the other side of the gate would be unnecessary.

I claim:

1. The combination with a pair of sliding gate members and means interconnecting said members for opposite movement, of gate posts supporting said members, operating levers at opposite sides of said members in corresponding positions with reference to the respective posts and positioned on opposite sides of the roadway, and means for directly connecting each operating lever to its adjacent gate member for actuating the latter.

2. The combination with a pair of sliding gate members and means interconnecting said members for opposite movement, of gate posts supporting said members, gate opening levers at opposite sides of said members in corresponding positions with reference to the respective posts, connections from each lever to its adjacent gate member, and gate closing levers remote from the gate at opposite sides thereof and connected to the respective gate opening levers for manipulation of the gate in a closing direction.

3. The combination with an overhead track and gates supported thereon for opposite movement, of anchorage plates carried by the respective gates, each plate being provided with a flange having an opening therethrough, pulleys connected with the track, and separate cables running from each anchorage plate around the pulley and through the opening in the flange of said plate to an anchorage in the other plate.

4. The combination with a sliding gate, of a lever device provided with motion transmitting connections to the gate, and an operating lever provided with spring cushioning means connected thereto, said operating lever projecting into the path of movement of a vehicle approaching the gate.

5. The combination with a sliding gate, of a lever device provided with motion transmitting connections to the gate, and an operating lever provided with spring cushioning means connected thereto, said operating lever projecting into the path of movement of a vehicle approaching the gate, said operating lever being at the level of the bumper of such a vehicle and having a roller in a position to be engaged by said bumper.

6. In a gate operating device, the combination with a gate, of an operating lever, a bar member pivotally mounted intermediate its ends, said operating lever being pivoted co-axially with said bar, springs connecting said lever with said bar upon each side of the pivot thereof, and link connections between a portion of said bar member and said gate.

7. In a gate operating device, the combination with a gate, of an operating lever, a bar member, link connections between one end portion of said bar member and said gate, and resilient means connecting said lever and bar, said lever and bar being pivotally mounted for relative movement, whereby movement of the lever through its pivotal connection with the bar causes the latter to operate the gate.

8. The combination with a pair of sliding gate members and means interconnecting said members for opposite movement, of gate posts supporting said members, vehicle engaged levers at opposite sides of said members in corresponding positions with reference to the respective posts, and connections from each lever to its adjacent gate member, said connections including shock absorbing means connected to the vehicle engaged levers and arranged to cushion the movement of each lever.

9. The combination with a pair of sliding gate members and means interconnecting said members for opposite movement, of gate posts supporting said members, operating levers at opposite sides of said members in corresponding positions with reference to the respective posts, and connecting means from each lever to its adjacent gate member, said means including springs located at opposite sides of each lever and connected with the same.

10. In a device for operating a gate, the combination with a pivot, of a manually operable lever rotatable about the axis of said pivot, a second lever rotatable about the axis of said pivot, spring means connecting the manually operable lever with the second lever for operation thereof and for movement relative thereto in either direction of movement when operating the second lever.

11. The combination with a pair of sliding gate members and means interconnecting said members for opposite movement, of gate posts supporting said members, operating levers at opposite sides of said members in corresponding positions with reference to the respective posts, and connecting means from each lever to its adjacent gate member, said means including reversely acting springs arranged to cushion the movement of the lever in either direction.

GUSTAV E. STRANDT.